T. RICHARD.
SAW FEEDING MECHANISM.
APPLICATION FILED FEB. 3, 1913.
1,079,145.
Patented Nov. 18, 1913.
4 SHEETS—SHEET 1.
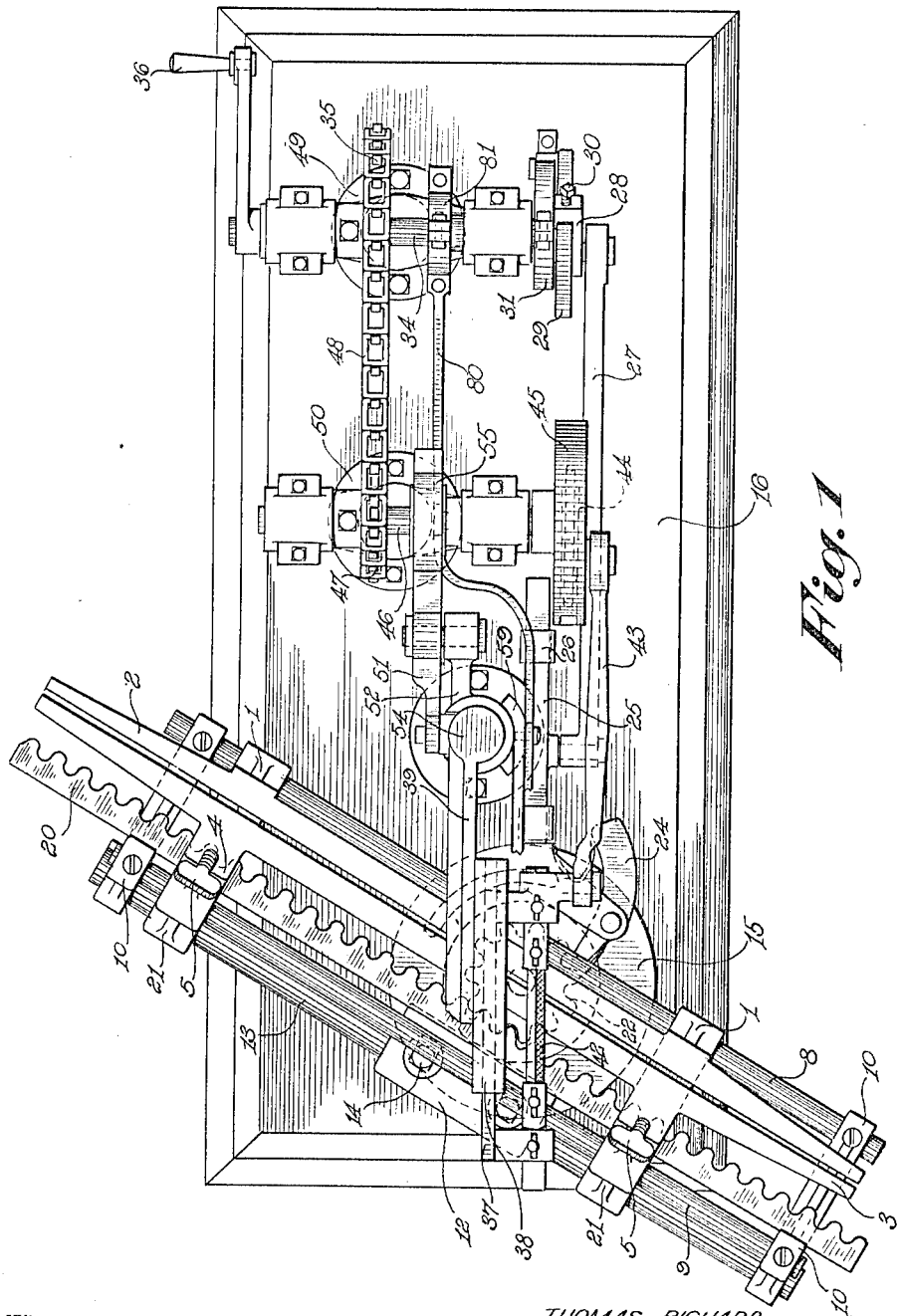
Witnesses:
THOMAS RICHARD
Inventor
By
Attorneys

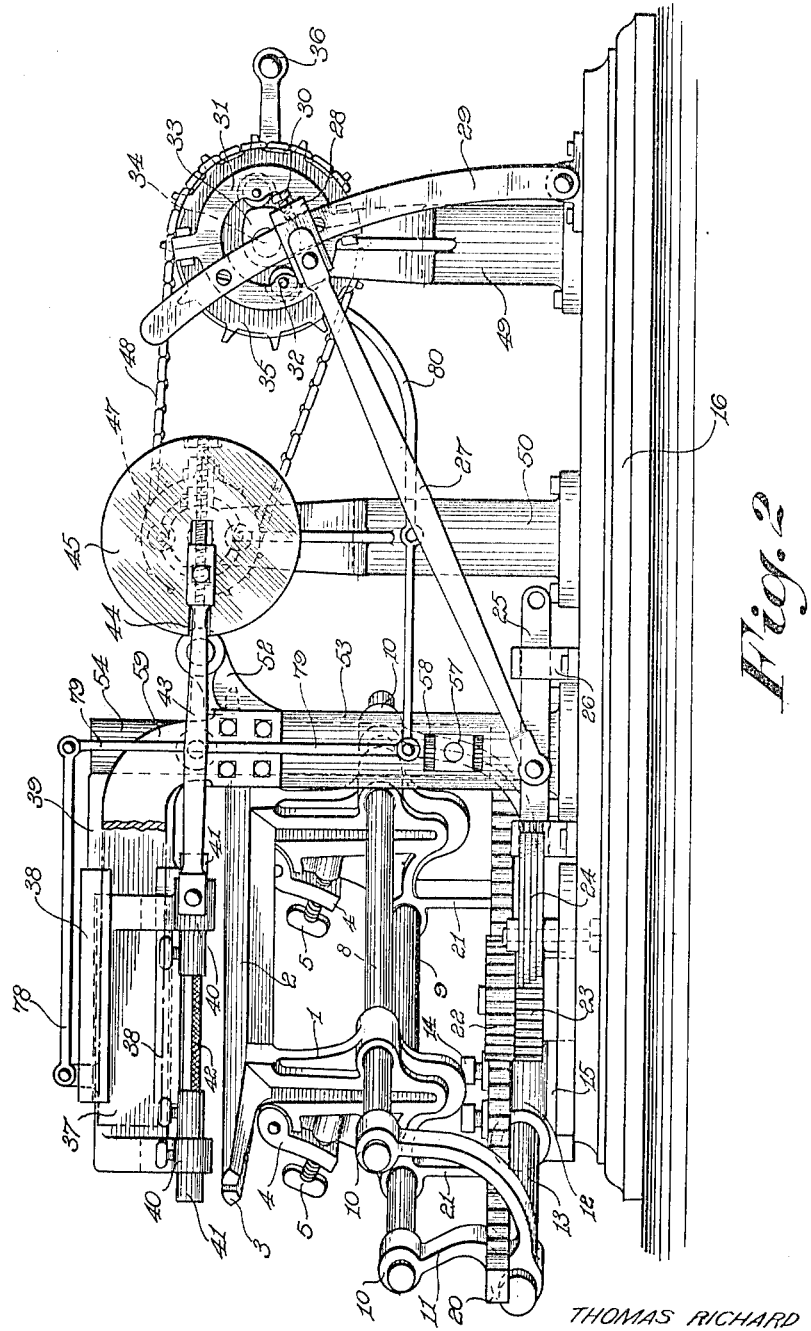

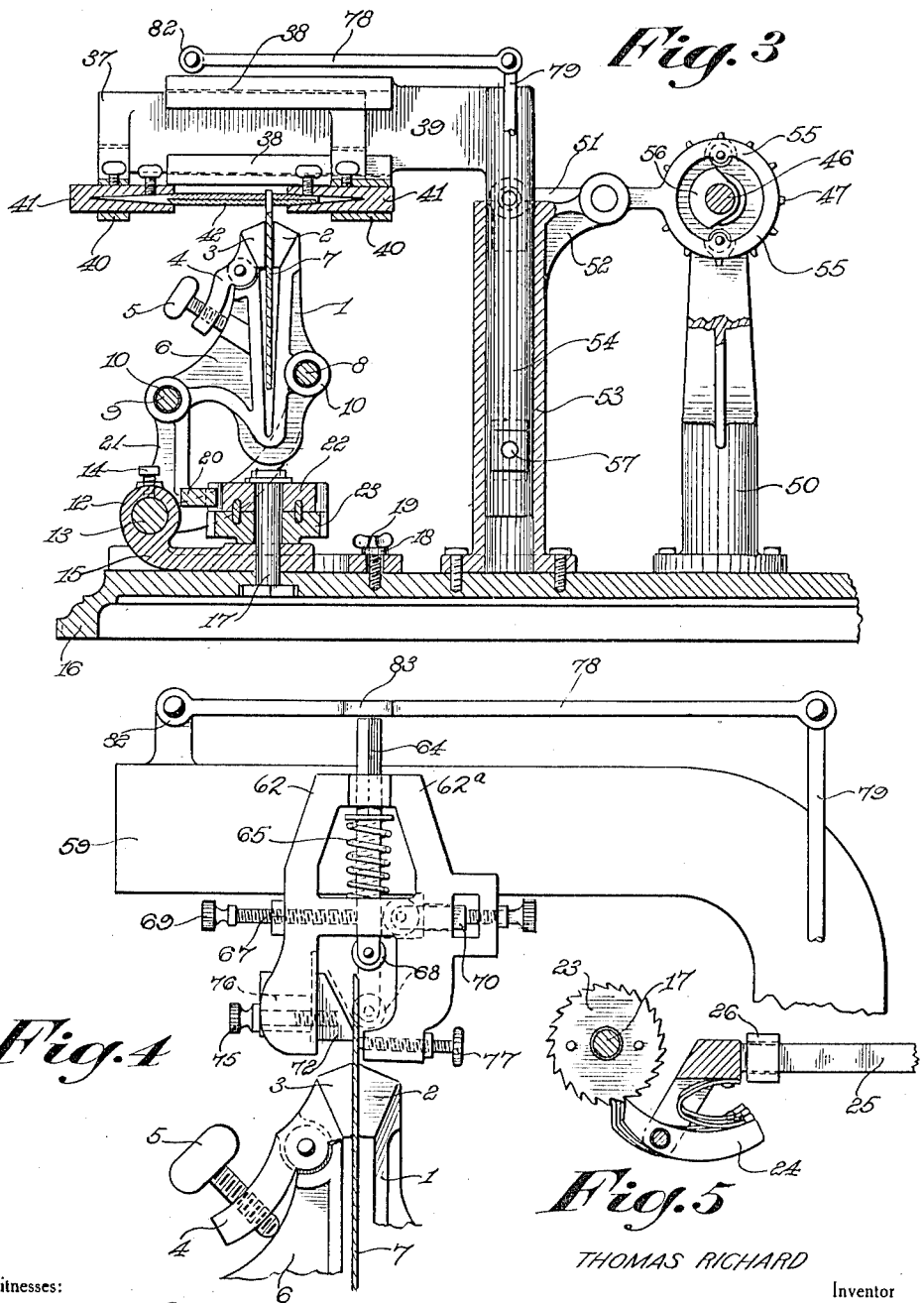

T. RICHARD.
SAW FEEDING MECHANISM.
APPLICATION FILED FEB. 3, 1913.
1,079,145.
Patented Nov. 18, 1913.
4 SHEETS—SHEET 4.
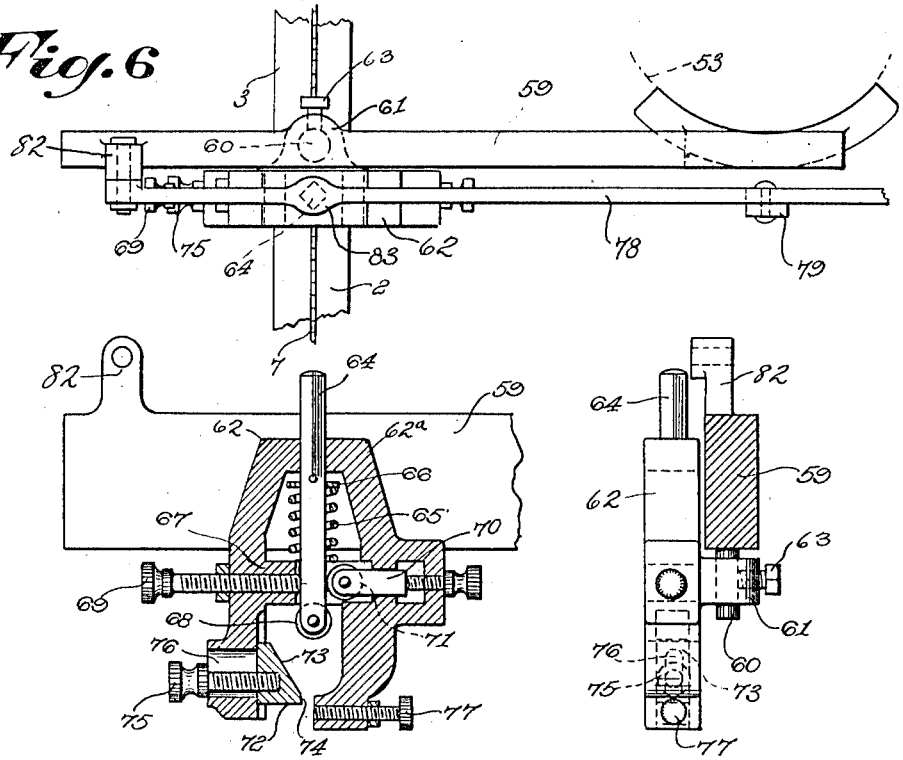
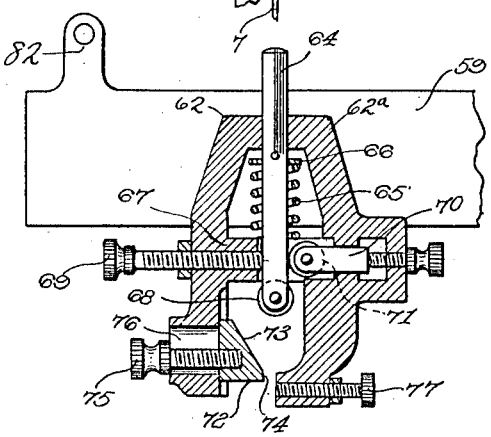
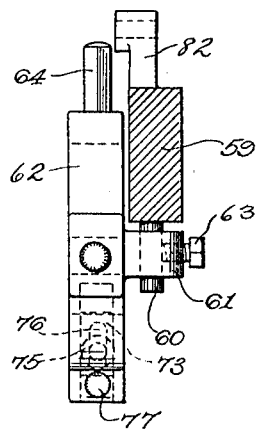
Fig. 6
Fig. 7
Fig. 8
Witnesses:
THOMAS RICHARD
Inventor
By
Attorneys

UNITED STATES PATENT OFFICE.

THOMAS RICHARD, OF MONTREAL, QUEBEC, CANADA, ASSIGNOR OF ONE-HALF TO AIMÉ BOILEAU, OF ST. RAPHAEL, ILE BIZARD, QUEBEC, CANADA.

SAW-FEEDING MECHANISM.

1,079,145. Specification of Letters Patent. Patented Nov. 18, 1913.

Application filed February 3, 1913. Serial No. 745,767.

*To all whom it may concern:*

Be it known that I, THOMAS RICHARD, a subject of the King of Great Britain, residing at Montreal, Province of Quebec, Canada, have invented certain new and useful Improvements in Saw-Feeding Mechanism; and I do hereby declare that the following is a full, clear, and exact description of the invention, such as will enable others skilled in the art to which it appertains to make and use the same.

The invention to be hereinafter described relates to saw setting and filing machines.

In order to more clearly disclose the construction, operation, and use of the invention, reference should be had to the accompanying drawings forming part of the present application.

Throughout the several figures of the drawings like reference characters designate the same parts.

In the drawings: Figure 1 is a top plan view of the machine; Fig. 2 is a side view; Fig. 3 is a fragmentary, vertical, sectional, side view; showing the operation of the file supporting arms; Fig. 4 is a detail side view of the saw set and its supporting arm; showing its operation; Fig. 5 is a detail view of the ratchet wheel and fingers for operating the saw frame; Fig. 6 is a top plan view of the saw set, its operating lever, and its supporting arm; Fig. 7 is a central, vertical, sectional view of the saw set; and Fig. 8 is a detail end view of the saw set, as secured to its supporting arm.

Broadly speaking the machine comprises slidably mounted saw holding means; slidably mounted saw filing means; saw setting means, and means for operating the several parts. The saw holding means comprises a contracted U shaped rigid frame 1 having an inner fixed jaw 2 and an oppositely opposed pivotally mounted outer jaw 3. The outer jaw 3 is provided near each end with a downwardly and outwardly presented arm 4 through which is threaded a hand screw 5 with its inner end bearing against the curved outer side 6 of the frame 1. By this means, after the saw has been placed between the two jaws 2 and 3 it may be secured in position by screwing the hand screws 5 in, thus forcing the arms 4 up and tightening the pivotally mounted jaw 3 against the saw blade 7.

The contracted U shaped frame 1 is slidably mounted on two parallel rods 8 and 9 carried in the upper ends of the curved end arms 10 of a sub frame 11. The sub frame 11 is slidably mounted in a sleeve 12 by means of a base rod 13 slidably operative therein. The sleeve 12 is provided with binding screws 14 for the purpose of securing the sub frame in any desired position. This sleeve is integral with a turntable 15 pivotally mounted on the base 16 of the machine, around a center pin 17.

The turntable 15 is provided with a quarter circumferential slot 18 through its inner side, through which a binding screw 19 operates to lock the turntable in any desired position. By the above means the sub arm 11 may be transversely adjusted through the sleeve 12; and the sub frame and the upper saw frame 1 carried thereby may be horizontally adjusted at any desired angle to the filing means.

For the purpose of moving the slidably mounted saw frame 1 along the rods 8 and 9, the rack 20 is provided, secured to the saw frame 1 by uprights 21 at each end of the frame, and operating between the curved arms 10 of the sub frame 11 which support the rods 8 and 9. The rack 20 is in engagement with a horizontally mounted cog wheel 22 secured to the upper face of a ratchet 23 which is mounted on the upper face of the central part of the turntable 15 around the center pin 17.

Ratchet wheel 23 is revolved by means of pivotally mounted spring pressed ratchet fingers 24 of gradually decreasing lengths carried on the outer end of a horizontal rod 25 slidably operative in standards 26 and in engagement with the ratchet wheel 23. The rod 25 is actuated back and forth through the standards 26 by a cam operated arm 27 the lower end of which is pivotally secured to the rod and the upper end of which is pivotally secured to a block 28. The block 28 is slidably adjustable on an upwardly curving arm 29 pivotally mounted at its lower end on the base 16; by means of a binding screw 30. A cam frame 31 provided with diametrically opposite interior roller bearings 32 is mounted near the upper end of the curved arm 29 on the inner face thereof, and around a cam 33 mounted on the end of the shaft 34 of the main drive sprocket wheel 35. It will be evident that when the main drive sprocket wheel 35 is revolved by means of the crank arm 36, that the curved arm 29 will be agitated back and forth and that this motion will be imparted to the horizontal rod 25; which, by means of the ratchet fingers 24 will revolve the ratchet wheel 23. As the ratchet wheel 23 revolves it will of course revolve the cog wheel 22 which is in engagement with the rack 20, and thus move the saw frame 1 along the rods 8 and 9. As the length of the stroke of the arm 27 can be regulated by means of the slidably adjustable block 28 on the curved arm 29; the motion of the saw frame 1 can also be regulated by the same means; as this motion is directly dependent upon the stroke of the arm 27. The ratchet fingers 24 being of gradually decreasing length, from the top finger to the bottom one, there will always be one or more fingers in engagement with the ratchet wheel 23, so that the movement of the saw frame 1 will be uniform; as there is no lost motion.

The saw filing means comprises a slidably mounted cam actuated file holder; means for securing the file in the holder; means for supporting the file holder; and means for lifting the file. The file holder comprises a plate 37 slidably mounted in guide ways 38 of a horizontal arm 39, and having downwardly slanting arms carrying collars 40 in which are slidably mounted sleeves 41 adapted to receive the ends of a file 42; as shown in Fig. 3. The collars 40 and sleeves 41 are provided with binding screws for the purpose of locking the sleeves 41 and the file 42 in adjustment, respectively.

The file holder is actuated back and forth by means of an arm 43 pivotally connected at its outer end to the file holder; and having its inner end pivotally connected to a block slidably adjustable in a groove 44 of a wheel 45 which is mounted on the end of the shaft 46 of a secondary drive sprocket wheel 47 driven from the main drive sprocket wheel 35 by means of a sprocket chain 48. The shafts 34 and 46 are supported by suitable branched standards 49 and 50, respectively.

The file lifting means comprises a horizontal arm 51 pivotally mounted on an arm 52 of a cylindrical standard 53, and having its outer end pivotally secured to the cylindrical supporting rod 54 of the horizontal arm 39 and its inner end provided with a cam frame 55 similar to the cam frame 31, and agitated by means of a cam 56 mounted on the shaft 46. The cylindrical supporting rod 54 of the horizontal rod 39 is slidably mounted in the cylindrical standard 53 so that the rod may be moved up and down therein by the horizontal arm 51. To limit the motions of the cylindrical rod 54 it is provided with lateral blocks 57 operating in openings 58, in the wall of the cylindrical standard 53. The filing operation may be described as follows: The saw is first secured in the saw frame 1, and then by means of the sliding adjustments and the turntable, set at the proper angle, and in the proper position in relation to the file. After the strokes of the several cam arms have been properly adjusted, the machine is operated by rotating the crank arm 36. The file is lowered into engagement with the saw teeth when being operated outwardly; but is lifted out of engagement when being operated inwardly. At the same time that the file is lifted out of engagement with the saw teeth, the saw frame and of course the saw, is moved along the rods 8 and 9 the space of two teeth, so that the file engages every other tooth. After the saw has been passed under the file once, it is then readjusted and passed under the file a second time; this completing the sharpening.

The saw setting means comprises a supporting arm, a specially constructed "set"; and means for operating the same. The saw set supporting arm 59 is secured to the cylindrical standard, as shown in Fig. 2; so as to extend parallel to and in front of the arm 39. The arm 59 is provided on its under face with a downwardly presented stud 60 adapted to be received by a collar 61 of the set 62, provided with a binding screw 63; for the purpose of securing the set to the arm.

The set 62 comprises an approximately rectangular frame $62^a$ in the upper part of which is loosely mounted a vertical plunger rod 64 normally held in a raised position by a coil spring 65 operating against a washer 66 secured around the plunger rod 64 and against a central wall 67 of the frame $62^a$ and carrying a pivotally mounted wheel 68 in its bifurcated lower end; means for adjusting the plunger rod and means for regulating the depth of the set of the saw.

The means for adjusting the plunger rod comprises a horizontal set screw 69 and a screw pressed horizontal member 70 carrying in its bifurcated inner end a wheel 71; both operating through the horizontal wall 67 and acting against opposite sides of the plunger rod 64. By this means the plunger rod may be given any desired slant. The means for regulating the depth of the set of the saw comprises a slidably mounted block 72 having an inner upwardly and outwardly slanting face 73 and a narrow vertical face 74; carried on the inner end of a set screw 75 slidably and vertically adjustable in a slot 76 through the outer wall of the frame $62^a$ in combination with a set screw 77 threaded through the inner wall of the frame $62^a$. The tooth edge of the saw 7 is inserted into the lower part of the set 62; the set screw is then adjusted so as to hold the blade firmly between the inner end of the screw and the vertical face 74 of the block 72. It will be evident from Fig. 4 that the depth of the bend of each tooth can only extend to the upper face of the vertical face 74 of the slidably mounted block 72; therefore, by adjusting the height of the block in relation to the edge of the saw, the depth of the "set" may be regulated.

The set 62 is operated by means of two pivotally connected, horizontal and vertical levers 78 and 79 respectively which are operated by a cam actuated arm 80, pivotally mounted on the standard 50 and carrying on its upper end a cam frame 81, similar to the cam frame 31, and operated by a cam mounted on the shaft 34; and pivotally connected at its lower end to the lower end of the vertical lever 79, by a bolt and nut connection. The horizontal lever 78 has its outer end pivotally connected to a lug 82 mounted on the top edge of the arm 59 so as to be a little in front of and above the arm; and is provided with a plate 83 adapted to engage the top of the plunger rod 64; so as to force it down.

The operation is as follows: As the arm 80 is agitated, the horizontal lever 78 is moved up and down in a vertical plane causing the plate 83 to strike the plunger rod 64 so as to force it down every time the lever is forced down; thus causing the wheel 68 carried in the lower ends of the plunger rod to be forced down against the side of the saw tooth, and in this way setting it. The set being operated from the same source, as the filing means sets every other tooth only and after the saw has been passed through the set once, it is then taken out of the saw frame and reversed in relation to its former position, and passed through the set again; this completing the operation. The set and the filing means may be used in combination or separately, as desired. When it is desired to use the filing means alone, the arm 59 may be removed from the standard 53, and the lower end of the vertical arm 79 may be disconnected from the lever 80 by removing the nut and bolt therefrom; this leaves the filing means free to be used alone.

The principal advantages of this invention are that by this means a saw can be set and sharpened in the one operation; or set or sharpened independently; and that the saw can be automatically adjusted for such setting and sharpening; and that it can be set at any desired angle to the file for sharpening purposes.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In combination with a machine of the character described slidably mounted, and slidably and pivotally adjusted saw holding means; means for securing the saw holding means in adjustment; and rack gear means for operating the slidably mounted saw holding means.

In witness whereof I have hereunto set my hand in the presence of two witnesses.

THOMAS RICHARD.

Witnesses:
 L. A. GAUVIN,
 E. J. GAUVIN.

---

Copies of this patent may be obtained for five cents each, by addressing the "Commissioner of Patents, Washington, D. C."